United States Patent
Inaganti et al.

(10) Patent No.: US 8,046,399 B1
(45) Date of Patent: Oct. 25, 2011

(54) FUSED MULTIPLY-ADD ROUNDING AND UNFUSED MULTIPLY-ADD ROUNDING IN A SINGLE MULTIPLY-ADD MODULE

(75) Inventors: Murali K. Inaganti, Santa Clara, CA (US); Leonard D. Rarick, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 910 days.

(21) Appl. No.: 12/020,486

(22) Filed: Jan. 25, 2008

(51) Int. Cl.
*G06F 7/38* (2006.01)

(52) U.S. Cl. .......................................... 708/501; 708/523

(58) Field of Classification Search .................. 708/501, 708/523

See application file for complete search history.

(56) References Cited

U.S. PATENT DOCUMENTS

| | | | |
|---|---|---|---|
| 6,275,838 B1 | 8/2001 | Blomgren et al. | |
| 6,460,134 B1 | 10/2002 | Blomgren et al. | |
| 6,542,916 B1 * | 4/2003 | Hinds et al. | 708/501 |
| 6,557,021 B1 | 4/2003 | Brooks et al. | |
| 6,889,241 B2 | 5/2005 | Pangal et al. | |
| 7,080,111 B2 | 7/2006 | Pangal et al. | |
| 7,099,910 B2 | 8/2006 | Brooks et al. | |
| 7,225,323 B2 * | 5/2007 | Siu et al. | 712/222 |
| 7,346,643 B1 * | 3/2008 | Ho et al. | 708/501 |
| 7,392,273 B2 | 6/2008 | Gerwig et al. | |
| 7,912,887 B2 * | 3/2011 | Dockser et al. | 708/501 |
| 2005/0228844 A1 * | 10/2005 | Dhong et al. | 708/501 |
| 2006/0179096 A1 * | 8/2006 | Fleischer et al. | 708/494 |

OTHER PUBLICATIONS

A. Naini, A. Dhablania, W. James and D. Das Sarma, "1 GHz HAL Sparc64 Dual Floating Point Unit with RAS Features," Proceedings of the 15th Symposium on Computer Arithmetic, pp. 173-183, 2001.*

C. C Hinds, "An Enhanced Floating Point Coprocessor for Embedded Signal Processing and Graphics Applications," Conference Record of the Thirty-Third Asilomar Conference on Signals, Systems, and Computers, pp. 147-151, 1999.*

Eric Charles Quinnell, "Floating-Point Fused Multiply-Add Architectures," PhD Dissertation at University of Texas at Austin, May 2007.*

Rarick, "Processor which Implements Fused and Unfused Multiply-Add Instructions in a Pipelined Manner", U.S. Appl. No. 12/057,894, filed May 15, 2008.

Rarick, "Leading Zero Estimation Modification for Unfused Rounding Catastrophic Cancellation", U.S. Appl. No. 12/121,053, filed May 15, 2008.

Schmookler et al., "Leading Zero Anticipation and Detection—A Comparison of Methods", *Proceedings of the 15th IEEE Symposium on Computer Arithmetic*, 2001, pp. 7-12.

* cited by examiner

*Primary Examiner* — Lewis Bullock, Jr.
*Assistant Examiner* — Matthew Sandifer
(74) *Attorney, Agent, or Firm* — Fliesler Meyer LLP

(57) ABSTRACT

A computer processor including a single fused-unfused floating point multiply-add (FMA) module computes the result of the operation A*B+C for floating point numbers for fused multiply-add rounding operations and unfused multiply-add rounding operations. In one embodiment, a fused multiply-add rounding implementation is augmented with additional hardware which calculates an unfused multiply-add rounding result without adding additional pipeline stages. In one embodiment, a computation by the fused-unfused floating point multiply-add (FMA) module is initiated using a single opcode which determines whether a fused multiply-add rounding result or unfused multiply-add rounding result is generated.

14 Claims, 3 Drawing Sheets

FUSED MULTIPLY-ADD ROUNDING AND UNFUSED MULTIPLY-ADD ROUNDING IN A SINGLE MULTIPLY-ADD MODULE

BACKGROUND OF THE INVENTION

1. Field of the Invention

The present invention relates to computer systems. More particularly, the present invention relates to computer processors.

2. Description of Related Art

In the computation of the multiply-add operation A*B+C, where A, B, and C are floating point numbers, rounding is accomplished utilizing one of two techniques. The first technique is termed fused multiply-add rounding, and the second technique is termed unfused multiply-add rounding.

FIG. 1 illustrates a conventional floating point multiply-add (FMA) module 100 utilizing conventional fused multiply-add rounding. In FIG. 1, a mantissa of an operand A is input to a carry save adder (CSA) 104 at an input 104_1, and a mantissa of an operand B is input to CSA 104 at an input 104_2. The partial products of the operation A*B are formed and reduced in CSA 104 until two partial products, term S and term T, remain. In the present example, term S is output from CSA 104 at output 104_3, and term T is output from CSA 104 at output 104_4.

In parallel with the operation of CSA 104, a mantissa of an operand C is input to an alignment module 102 at an input 102_1, and the binary point of the mantissa of operand C is aligned with a position of a binary point of the product of A*B. The resultant aligned C term is output from alignment module 102 at output 102_2.

Term S, term T, and the portion of the aligned C term that is not larger than the product of A*B, are input to a full adders module (FA) 106, respectively at inputs 106_2, 106_3 and 106_1, and combined in full adders of FA module 106 to produce two resulting new terms, term X and term Y. Term X is output from FA module 106 at output 106_4, and term Y is output from FA 106 at output 106_5.

Term X and term Y are next input to a carry lookahead adder (CLA) 108, respectively at inputs 108_1, and 108_2. Term X and term Y are added in CLA 108 to produce two resultant sums, a first sum for a carry-in of zero, herein termed Sum C0, and a second sum for a carry-in of 1, herein termed Sum C1. Sum C0 is output from CLA 108 at output 108_4 and Sum C1 is output from CLA 108 at output 108_3.

The portion of the aligned C mantissa that is larger than the product of A*B, output from alignment module 102 at output 102_2, is input to an increment module 110 at input 110_1 and incremented in increment module 110. The incremented term output from increment module 110 at output 110_2 is input to mux 114 at input 114_1 together with the unincremented aligned C term input to mux 114 at input 114_2.

The Sum C0 term output from CLA 108 is input to mux 112 at input 112_2 together with the Sum C1 term input at input 112_1. Initially, the value of zero is used as input at input 112_3. The resultant carry out of mux 112 at output 112_4 is then input to mux 114 at input 114_3 and is used to select the incremented or unincremented high order bits, i.e., the bits that are in positions larger than the positions for the product of A and B, in mux 114. The initially selected high order bits are then output from mux 114 at output 114_4.

The resultant carry out from mux 114 is termed the end around carry. The end around carry is then used as the carry in to CLA 108, which is accomplished by replacing the initial input of zero at input 114_3 to mux 114 with the end around carry value. After this replacement, the output from mux 112 at output 112_4 becomes the input to normalizer module 116 at input 116_2. The carry out from mux 112 at output 112_4 is input to mux 114 at input 114_3 and used to select the incremented or unincremented high order bits.

The selected high order bits output from mux 114 are then input to normalizer 116 at input 116_1 together with the resultant carry out of mux 112 input to normalizer 116 at input 116_2.

Normalizer 116 normalizes the values and outputs the normalized value at output 116_3. The normalized value is input to a rounding module 118 at input 118_1 where the normalized value is rounded and the fused multiply-add rounding result output from rounding module 118 at output 118_2. The above fused multiply-add rounding method is well known to those of skill in the art and is not further described herein in detail to avoid detracting from the principles of the invention.

SUMMARY OF THE INVENTION

In accordance with one embodiment of the invention, a computer processor including a single fused-unfused floating point multiply-add (FMA) module computes the result of the operation A*B+C for floating point numbers for fused multiply-add rounding operations, when in a fused multiply-add rounding mode, and for unfused multiply-add rounding operations, when in an unfused multiply-add rounding mode. In one embodiment, a fused multiply-add rounding implementation is augmented with additional hardware which calculates an unfused multiply-add rounding result without adding additional pipeline stages. In one embodiment, a computation by the fused-unfused floating point multiply-add (FMA) module is initiated using a single opcode to compute a fused multiply-add rounding result and using a different single opcode to compute an unfused multiply-add rounding result.

Embodiments described herein are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Nearly all conventional computer processors, whether or not they provide a fused multiply-add operation, have both floating point multiply instructions and add instructions. An unfused multiply-add operation can be carried out by executing a multiply operation followed by an add operation. As each operation applies a rounding operation, the result obtained is the unfused multiply-add rounding result.

Herein the symbol "*" in an equation, such as A*B+C, represents the mathematical operation of multiplication, unless otherwise noted. Further, herein the symbol "+" in an equation, such as A*B+C, represents the mathematical operation of addition, unless otherwise noted. Additionally, herein the symbol "=" in an equation, such as A*B+C=(A*B)+C, represents the mathematical expression "equals" unless otherwise noted. Also, herein the symbol "~" in an equation, such as ((A*B)+~C), represents the mathematical expression "complement", unless otherwise noted.

Further herein for purposes of description, operands A, B, and C refer to the mantissa portions of floating point numbers, unless otherwise specified. Further, although the operations described herein are primarily described with reference to single precision calculation, e.g., 24 bit mantissa, those of skill in the art can recognize the embodiments are applicable to double precision, quad precision, or other precision operations as well.

In the examples provided herein, floating point values with a mantissa of 24 bits are used; however, those of skill in the art can recognize that embodiments of the invention are applicable to mantissas of other bit counts, and that the invention is not limited to the examples detailed herein.

Figure 1:
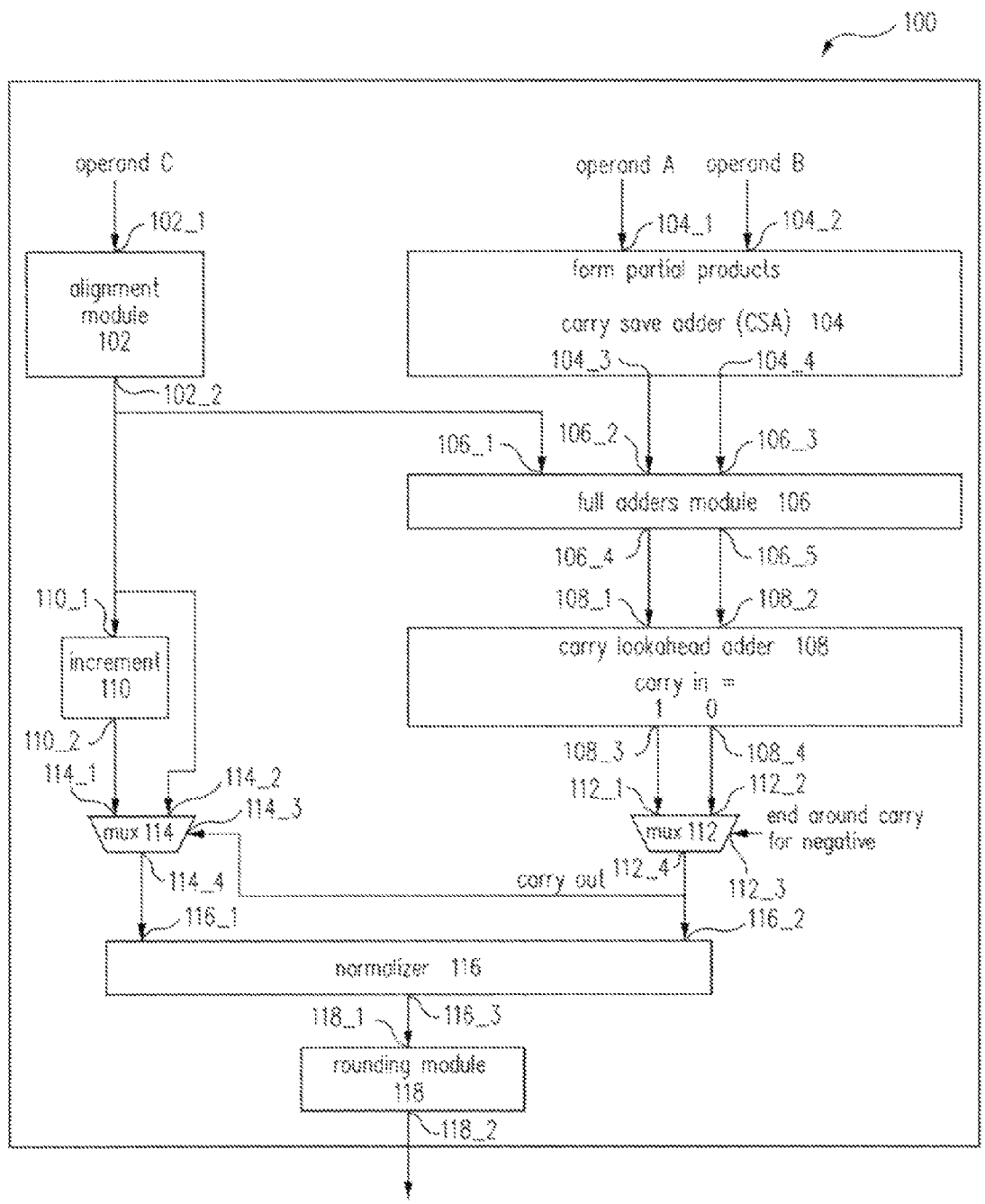
FIG. 1 illustrates a conventional floating point multiply-add (FMA) module utilizing conventional fused multiply-add rounding.
Figure 2:
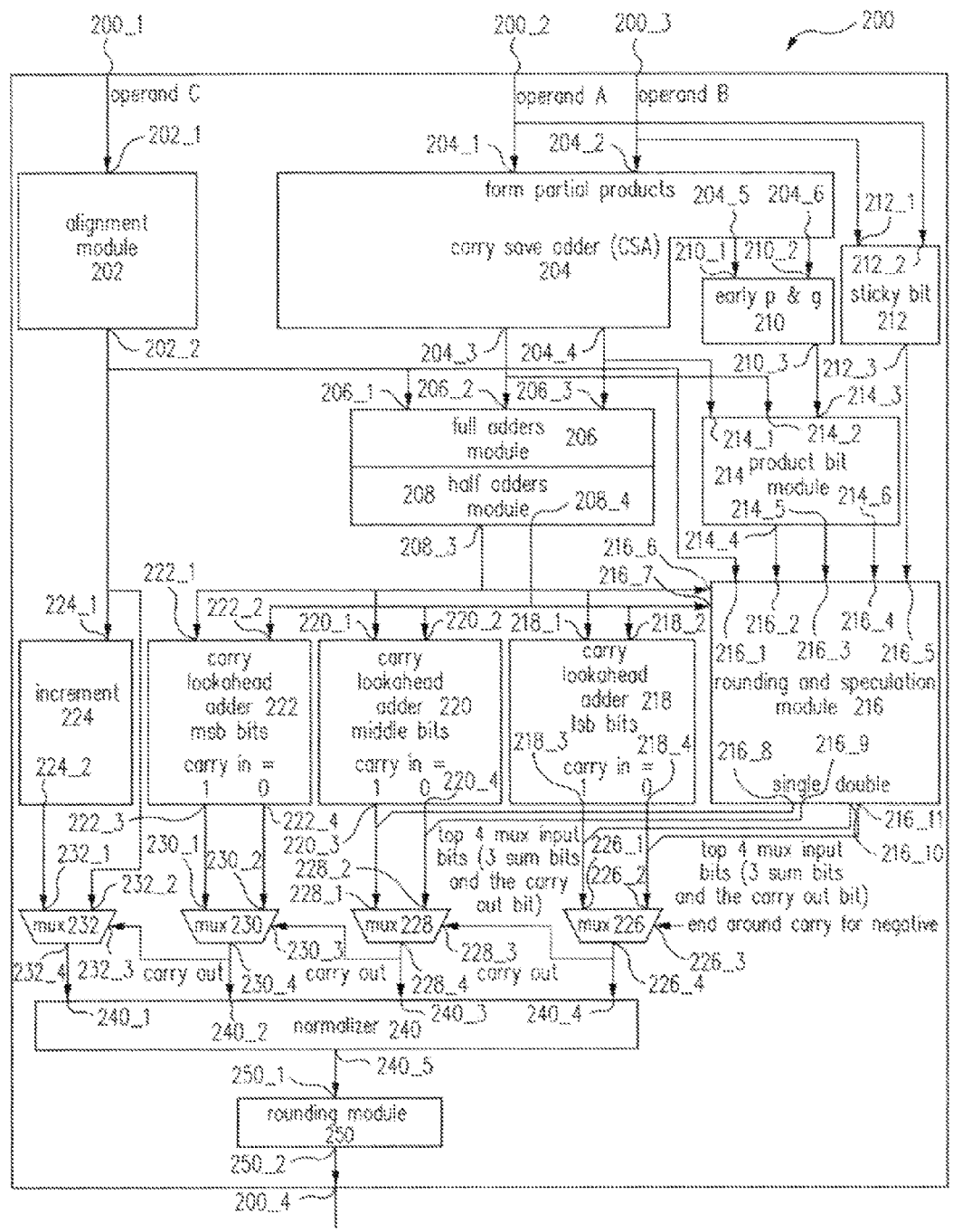
FIG. 2 illustrates a single fused-unfused floating point multiply-add (FMA) module which generates both fused multiply-add rounding and unfused multiply-add rounding results in accordance with one embodiment of the invention.

FIG. 2 illustrates a single fused-unfused floating point multiply-add (FMA) module 200 which generates both fused multiply-add rounding and unfused multiply-add rounding results in accordance with one embodiment of the invention.

In one embodiment, fused-unfused FMA module 200 receives operands from a computer processor (see FIG. 2). In one embodiment, when an opcode provided is a fused multiply-add opcode, fused-unfused FMA module 200 generates a fused multiply-add rounding result, and when an opcode provided is an unfused multiply-add opcode, fused-unfused FMA module 200 generates an unfused multiply-add rounding result. In another embodiment, fused-unfused FMA module 200 receives a single opcode with a deterministic mode bit. If the mode bit is set a first way, e.g., set to one, a fused multiply-add rounding result is generated, and if the mode bit is set a second way, e.g., set to zero, an unfused multiply-add rounding result is generated.

Referring now to FIG. 2, in one embodiment fused-unfused FMA module 200 includes: an alignment module 202, a carry save adder (CSA) module 204, and a sticky bit module 212, which selectively receive input operands. For example, fused-unfused FMA module 200 receives an input operand C, an addition term, at input 200_1, an input operand A, a first multiply term, at input 200_2, and an input operand B, a second multiply term, at input 200_3.

Alignment module 202 receives inputs, such as input operand C, at input 202_1. Alignment module 202 is connected, at output 202_2, to: an increment module 224, at input 224_1; a mux module 232, at input 232_2; a full adders module 206, at input 206_1; and, a rounding and speculation module 216, at input 216_1.

Increment module 224 is connected, at output 224_2, to mux module 232, at input 232_1. Outputs from mux module 232, at output 232_4, are input to a normalizer 240, at input 240_1.

CSA module 204 receives inputs, such as input operand A, at input 204_1, and input operand B, at input 204_2. CSA module 204 is further connected, at output 204_3, to full adders module 206, at input 206_2, and to a product bit module 214 at input 214_2.

CSA module 204 is further connected, at output 204_4, to full adders module 206, at input 206_3, and to product bit module 214, at input 214_1. CSA module 204 is further connected, at output 204_5, to an early propagate and generate (p&g) module 210, at input 210_1; and, also connected, at output 204_6, to input 210_2. Early p&g module 210 is further connected, at output 210_3, to product bit module 214, at input 214_3.

Sticky bit computation module 212 also receives input of operand A, at input 212_2, and input of operand B, at input 212_1. Sticky bit computation module 212 is further connected, output 212_3, to rounding and speculation module 216, at input 216_5.

Full adders module 206 is further connected to half adders module 208. For example, although not shown, full adders module 206 is connected, at output 206_4, to half adders module 208, at input 208_1, and also connected, at output 206_5 to half adders module 208, at input 208_2.

Half adders module 208 is further connected to carry look-ahead adders (CLAs) 218, 220, and 222, and to rounding and speculation module 216. More particularly, half adders module 208 is connected, at output 208_3, to: input 218_1 of CLA 218; to input 220_1 of CLA 220; and, to input 222_1 of CLA 222; and to input 216_6 of rounding and speculation module 216. Further, half adders module 208 is connected at output 208_4, to: input 218_2 of CLA 218; to input 220_2 of CLA 220; and, to input 222_2 of CLA 222; and to input 216_7 of rounding and speculation module 216.

CLA 218 is further connected, at output 218_3, to mux module 226, at input 226_1, and, at output 218_4 to mux module 226, at input 226_2. Mux module 226 is further connected at output 226_4 to mux module 228 at input 228_3, and to normalizer 240 at input 240_4.

CLA 220 is further connected, at output 2203, to mux module 228, at input 228_1, and, at output 220_4 to mux module 228, at input 228_2. Mux module 228 is further connected at output 228_4 to mux module 230, at input 230_3, and to normalizer 240 at input 240_3.

CLA 222 is further connected, at output 222_3, to mux module 230, at input 230_1, and, at output 222_4 to mux module 230, at input 230_2. Mux module 230 is further connected at output 230_4 to mux module 232, at input 232_3, and to normalizer 240 at input 240_2.

Product bit module 214 is further connected to rounding and speculation module 216. More particularly, in one embodiment, product bit module 214 is connected, at output 214_4 to rounding and speculation module 216, at input 216_2. Product bit module 214 is further connected, at output 214_5, to rounding and speculation module 216, at input 216_3. Product bit module 214 is also connected, at output 214_6, to rounding and speculation module 216, at input 216_4.

In one embodiment, rounding and speculation module 216 is connected, at output 216_11 to mux module 226, at input 226_2, and also connected at output 216_10, to mux module 226, at input 226_1.

Rounding and speculation module 216 is connected, at output 216_9, to mux module 228, at input 228_2, and also connected at output 216_8, to mux module 228, at input 228_1.

Normalizer module 240 is connected at output 240_5, to rounding module 250, at input 250_1. The result of rounding module 250 is output, at output 2502, and further output from fused-unfused FMA 200, at output 200_8.

In the present embodiment, fused-unfused FMA module 200 receives an input, such as a single unfused multiply-add rounding opcode, which initiates an unfused multiply-add rounding operation, also termed herein an unfused multiply-add rounding mode, or receives an input, such as a single fused multiply-add rounding opcode, which initiates a fused multiply-add rounding operation, also termed herein a fused multiply-add rounding mode.

Unfused Multiply-Add Rounding Mode

Referring now to FIG. 2, in unfused multiply-add rounding mode, in one embodiment, operand C is input to alignment module 202, and operand A and operand B are input to carry save adder (CSA) 204. For example, in FIG. 2, operand C, an addition term, is input to alignment module 202 at input 202_1, operand A, a first multiply term, is input to CSA 204 at input 204_1, and operand B, a second multiply term, is input to CSA 204 at input 204_2.

In one embodiment, carry save adder 204 is composed of 4:2 compressors, 3:2 compressors (also known as full adders), 5:3 compressors, and/or half adders, and contains either AND gates or Booth encoders. Carry save adders and alignment modules are well known to those of skill in the art and are not further described herein in detail to avoid detracting from the principles of the invention.

In CSA 204, the partial products of operand A and B are computed and added until two partial products remain, term S and term T. Herein the remaining two partial products are also termed terminal partial products, where term S is the first terminal partial product and term T is the second terminal partial product. Term S and term T, if added together, would produce the product of A*B; however, in unfused multiply-add rounding mode, the terms S and T are not added together, and the product value is not available.

From CSA module 204, term S and term T are input to a row of full adders, full adders module 206. For example, term S is output from output 204_3 of CSA 204 and input to full adders 206 at input 206_2; and, term T is output from output 204_4 of CSA 204 and input to full adders module 206 at input 206_3.

In one embodiment, each full adder in full adders module 206 is a 3:2 compressor. Full adders are well known to those of skill in the art and not further described herein to avoid detracting from the principles of the invention.

Concurrently, with the operations of CSA 204, the value of operand C is aligned in alignment module 202 to align the binary point of C with the binary point of the product of operand A and operand B. Binary points and the alignment of floating point numbers are terms well known to those of skill in the art and not further described in detail herein to avoid detracting from the principles of the invention. The aligned C value, also termed the aligned addition term and C(al), is output from alignment module 202, for example, at output 202_2, and the part of the aligned C value that has positions in common with the product of operand A and operand B is input to full adders module 206, for example at input 206_1.

If operand A and operand B, are values between 1 and 2, the product of A*B is between 1 and 4. Example 1 shows a representation of terms S and T output from CSA 204, where X represents a bit having a value of 0 or 1.
S=XX.XXXXXXXX_XXXXXXXX_XXXXXXXX_XXXXXXXX_XXXXXXXX_XXXXXX
T=XX.XXXXXXXX_XXXXXXXX_XXXXXXXX_XXXXXXXX_XXXXXXXX_XXXXXX Example 1

If the product of A*B is between 1 and 2, the rounded 24 bit mantissa is located one bit to the right of the rounded 24 bit mantissa if the product of A*B is between 2 and 4, as shown in Example 2.
between 1 and 2=X.XXXXXXXX_XXXXXXXX_XXXXXXX
between 2 and 4=XX.XXXXXXXX_XXXXXXXX_XXXXXX Example 2

In one embodiment, term S and term T are truncated in full adders module 206 before being combined with the aligned C term in full adders module 206. In one embodiment, the truncation is implemented so that later formed terms X and Y do not contain data from terms S and/or T that do not contribute to an unfused multiply-add rounding result. In one embodiment, the truncation is implemented by zeroing the last 24 bits, i.e., the rightmost 24 bits, of term S and term T to produce a truncated term S, also termed herein the truncated first terminal partial product, S(tr), and a truncated term T, also termed herein the truncated second terminal partial product, T(tr).

At the time of the truncation, the value of the most significant bit (msb) of the product is unknown. If the product is between 1 and 2, the msb of the product is 0; and if the product is between 2 and 4, the msb of the product is 1. In one embodiment, the term S and term T are truncated as if the msb is 1, as shown in Example 3.
S(tr)=XX.XXXXXXXX_XXXXXXXX_XXXXXX00_00000000_00000000_000000
T(tr)=XX.XXXXXXXX_XXXXXXXX_XXXXXX00_00000000_00000000_000000

Example 3

If the msb of the product is 1, then 2 bits need to be added with the truncated S and T terms if the rounded product were to be obtained. The rounded product itself need not be obtained, but the value of the sum of the rounded product and the aligned C term is obtained. Hence these two bits do need to be added with the sum of the truncated S and T terms and the aligned C term. Herein the 2 bits that need to be added with the truncated values of S and T and the aligned C terms are termed bit K and bit R, as shown in Example 4.

$S(tr) = XX.XXXXXXXX\_XXXXXXXX\_XXXXXX00\_$ $00000000\_00000000\_000000$ $T(tr) = XX.XXXXXXXX\_XXXXXXXX\_XXXXXX00\_$ $00000000\_00000000\_000000$ $K$ $R$

Example 4

Bit K is the carry-in from the sum of the 24 bits of terms S and T that were replaced with zeros in truncation. Bit R is the rounding bit for the rounded product value. If the product A*B is to be rounded up, instead of truncated down, then the product is incremented if the truncated product is not exact. Thus, the function of the bit R is to increment the product, and may be 1 if rounding up or to the nearest. Rounding up and rounding to the nearest are rounding conventions well known to those of skill in the art and not further described herein to avoid detracting from the principles of the invention. Further, carry-in bits and rounding bits are well known to those of skill in the art and are not further described in detail to avoid detracting from the principles of the invention.

Since the mantissa of any value is positive (the sign is kept elsewhere), if subtraction is called for, there are two cases to obtain a positive mantissa for the final result. In the first case, if A*B>C, then (A*B)−C is computed by (A*B)+~C+1. However, in the second case, if A*B<C, then C−(A*B) is computed. In the second case, note that $$C - (A*B) = -((A*B) - C)$$
$$= -((A*B) + \sim C + 1)$$
$$= -((A*B) + \sim C) - 1$$
$$= -((A*B) + \sim C) + 1 - 1$$
$$= -((A*B) + \sim C).$$

Thus, (A*B)+~C is computed before it is known which of the above cases is correct. The ~C is produced in alignment module 202. When the correct case is determined, i.e., the first case or the second case, if it is the first case, the value of 1 is added to the result, but if the correct case is the second case, the value of 1 is not added to the result. Instead, the result is complemented. The first and second cases for subtraction are also referred to herein as the two subtraction methods, i.e., the first subtraction method referring to the first case, and the second subtraction method referring to the second case.

Alternatively, if the msb of the product is 0, rather than 1, then 4 bits need to be added with the truncated values of terms S and T if the rounded product is to be obtained. The rounded product itself need not be obtained, but the value of the sum of the rounded product and aligned C term is obtained. Hence these four bits do need to be added with the sum of the truncated S and T terms and the aligned C term. Herein the 4 bits that need to be added with the truncated values of S and T and the aligned C terms are termed bit W, bit Z, bit N, and bit M, as shown in Example 5.

$$S = XX.XXXXXXXX\_XXXXXXXX\_XXXXXX00\_$$
$$00000000\_00000000\_000000$$
$$T = XX.XXXXXXXX\_XXXXXXXX\_XXXXXX00\_$$
$$00000000\_00000000\_000000$$
$$W$$
$$Z$$
$$N$$
$$M$$

Example 5

Bit W is the most significant bit (msb) of the portion of the term S that was zeroed out on the assumption that the msb would be 1, rather than 0. Bit Z is the most significant bit (msb) of the portion of the term T that was zeroed out on the assumption that the msb would be 1, rather than 0. Bit N is the carry-in from the sum of the rightmost 23 bits of the 24 bits of terms S and T that were replaced with zeroes in truncation. Bit M is the rounding bit, similar to the R bit, except computed for the position one bit to the right of that instance.

Again, since the mantissa of any value is positive, if subtraction is called for, there are two cases to obtain a positive mantissa for the final result. In the first case, if A*B>C, then (A*B)-C is computed by (A*B)+~C+1. However, in the second case, if A*B<C, then C-(A*B) is computed. Note that C-(A*B)=~((A*B)+~C). Thus, (A*B)+~C is computed before which the actual case is determined. The ~C is produced in alignment module 202. When the case is determined, if it is the first case, the value of 1 is added to the result, but if it is the second case, the value of 1 is not added; instead, the result is complemented.

In determining the unfused multiply-add rounding of the product, a determination is made whether or not one bit is to be added for rounding, i.e., the R bit (or M bit) earlier discussed. More particularly, a determination is made whether the R bit (or M bit) is equal to 0 or 1.

To determine the value of the K, R, N, and M bits, all of the values of the terms S and T do not need to be added up; however, a few of the values of the sum of the terms S and T need to be determined.

The value of the most significant bit (msb) of the product is determined; also, the value of the least significant bit (lsb) of what would be the truncated sum of the product is determined, herein termed bit L. Further, the value of the next lower bit of the product before truncation is determined, referred to as the guard bit, herein termed bit G, and the sticky bit is determined.

For 24 bit precision, if the msb bit of the product is 1, then the representation of the sum of the terms S and T is as shown in Example 6.

1X.XXXXXXXX_XXXXXXXX_XXXXXXLGI_I-IIIIII_IIIIIII_IIIIIII

Example 6

For 24 bit precision if the msb bit of the product is instead 0, then the representation of the sum of the terms S and T is as shown in Example 7.

01.XXXXXXXX_XXXXXXXX_XXXXXXLG_II-IIIIII_IIIIIII_IIIIIII

Example 7

In the above examples, the sticky bit is the "OR" of all the I bits, where I represents bits in less significant positions than the guard bit. Sticky bits are well known to those of skill in the art and are usually determined by actually taking the OR of the I bits specified above.

In the present embodiment, however, that approach would require implementing enough of the adder to determine all the I bits, which otherwise are not needed. Thus, the sticky bits are not obtained in the above manner. Instead, in one embodiment, the sticky bit for the case where the msb bit is 0 is obtained by adding the counts of the trailing zeros in the operands A and B in module sticky bit 212. If the sum is large enough, e.g., 23 or more for single precision and 52 or more for double precision, the sticky bit is 0; otherwise, the sticky bit is 1. The sticky bit for the case where the msb bit is 1 is obtained by ORing the sticky bit for the case where the msb bit is 0 and the G bit for the case where the msb bit is 0.

In one embodiment, a portion of a carry lookahead adder for the terms S and T is implemented in early p&g module 210 and product bit module 214, in order to obtain the msb bit, the carry-in bits K and N, and the values of bit L and bit G for either value of the msb bit, i.e., 0 or 1. These bits are also termed herein respectively j, u, v, and f, where: j represents the most significant bit of the product; u represents the least significant bit of the product when the msb bits is 1, i.e., bit L when the msb bit is 1; v represents the guard bit value when the msb bit is 1, i.e., bit G, and also the least significant bit of the product when the msb bit is 0, i.e., bit L when the msb bit is 0; f represents the guard bit when the msb bit is 0, i.e., bit G when the msb bit is 0. The bits j, u, v, and f for products having an msb of 1 and 0 are illustrated in Example 8 for msb of 1 and msb of 0.

```
1.XXXXXXXXXXXXXXXXXXLGIIIIIIIIIIIIIIII
01.XXXXXXXXXXXXXXXXXXLGIIIIIIIIIIIIIII
↑                   ↑ ↑ ↑
j                   u v f
```

Example 8

If more than one precision is to be determined, then each of the bits j, u, v, and f, is obtained for each precision.

With the values of j, u, v and f, and the value of the sticky bit, the sign of the product, the rounding mode, the value of bits R and M, the rounding bits, are obtained in accordance with the IEEE standard for Binary Bloating-Point Arithmetic (ANSI/IEEE STD 754-1985).

An example of a table for obtaining the value of bits R and M in accordance with the above IEEE standard is shown in Table 1 (an asterisk * means the value can be either 0 or 1 in Table 1).

TABLE 1

| juvf | sticky bit | sign | rounding mode | R | M |
|------|------------|------|---------------|---|---|
| **** | *          | *    | truncate      | 0 | 0 |
| 1*0* | *          | *    | nearest       | 0 | * |
| 1010 | 0          | *    | nearest       | 0 | * |
| 1110 | 0          | *    | nearest       | 1 | * |
| 1*10 | 1          | *    | nearest       | 1 | * |
| 1*11 | *          | *    | nearest       | 1 | * |
| 1*00 | 0          | 0    | plus infinity | 0 | * |
| 1*00 | 1          | 0    | plus infinity | 1 | * |
| 1*01 | *          | 0    | plus infinity | 1 | * |
| 1*1* | *          | 0    | plus infinity | 1 | * |
| 1*** | *          | 1    | plus infinity | 0 | * |
| 1*00 | 0          | 1    | minus infinity| 0 | * |
| 1*00 | 1          | 1    | minus infinity| 1 | * |
| 1*01 | *          | 1    | minus infinity| 1 | * |
| 1*1* | *          | 1    | minus infinity| 1 | * |
| 1*** | *          | 0    | minus infinity| 0 | * |
| 0**0 | *          | *    | nearest       | * | 0 |
| 0*01 | 0          | *    | nearest       | * | 0 |
| 0*11 | 0          | *    | nearest       | * | 1 |
| 0**1 | 1          | *    | nearest       | * | 1 |
| 0**0 | 0          | 0    | plus infinity | * | 0 |
| 0**0 | 1          | 0    | plus infinity | * | 1 |
| 0**1 | *          | 0    | plus infinity | * | 1 |
| 0*** | *          | 1    | plus infinity | * | 0 |
| 0**0 | 0          | 1    | minus infinity| * | 0 |
| 0**0 | 1          | 1    | minus infinity| * | 1 |
| 0**1 | *          | 1    | minus infinity| * | 1 |
| 0*** | *          | 0    | minus infinity| * | 0 |

In one embodiment, the process of finding the values of j, u, v, and f begins as soon as part of the values of terms S and T are known. Thus, in one embodiment, the values of K, N, j, u, v, and f are determined in parallel with the operations of full adders module 206 and half adders module 208, which are determining the values X and Y, and also in parallel with the early portion of the addition of values X and Y in carry look-ahead adders 218, 220, and 222. Additionally, in one embodiment, the process of finding the correct sum of the product begins before the value of bits R and M are known.

In one embodiment, as further described herein, in order to determine the correct sum from carry-look-ahead adders 218, 220, and 222, the msb bits W and Z, as well as the K bit, N bit, R bit, and M bit are computed in rounding and speculation module 216 while full adders module 206, half adders module 208, and carry-look-ahead adders 218, 220, and 222, are in progress.

Example 9 shows truncated term S and truncated term T and the aligned C term prior to combination in full adders module 206. The arrow indicates the least significant possible non-zero carry out (lspc) bit.

$S = XX.XXXXXXXX\_XXXXXXXX\_XXXXXX00\_00000000\_$ $00000000\_000000$ $T = XX.XXXXXXXX\_XXXXXXXX\_XXXXXX00\_00000000\_$ $00000000\_000000$ $C = XX.XXXXXXXX\_XXXXXXXX\_XXXXXXXX\_$ $XXXXXXXX\_XXXXXX$

↑ lspc

Example 9

The resultant sum output and the carry output from full adders module 206 are shown in Example 10. The arrow indicates the least significant possible non-zero carry out (lspc) bit.

$sum = ...XXXXXX.XXXXXXXX\_XXXXXXXX\_XXXXXXXX\_$ $XXXXXXXX\_XXXX...$ $carry = ...000XXX.XXXXXXXX\_XXXXXXX\_XXXXX000\_$ $00000000\_00000000\_0000...$

↑ lspc

Example 10

In one embodiment, to avoid too large a carry from where the extra bits are added in, a row of half adders, half adders module 208 is inserted after full adders module 206 and before the values, later termed herein X and Y, are passed to carry look ahead adders 218, 220, and 222. Half adders are well known to those of skill in the art and not further described herein to avoid detracting from the principles of the invention. Further a sum output and a carry output from a full adder are well known to those of skill in the art and are not further described herein to avoid detracting from the principles of the invention.

The sum output, SumOut, and the carry output, CarryOut, of full adders module 206 are then output from full adders module 206 (for example, respectively at outputs 206_4 and 206_5, not shown) and input to a half adders module 208 (for example, respectively, at inputs 208_1 and 208_2, not shown) with resultant terms X and Y calculated as shown in Example 11. Where X represents the sum output and Y represents the carry output from half adders module 208, respectively at outputs 208_3 and 208_4. The arrow indicates the least significant possible non-zero carry out (lspc) bit.

X = ...XXXXXXX.XXXXXXXX_XXXXXXX_XXXXXXXX_

XXXXXXXX_XXXXXXXX_XXXX...

Y = ...000XXX.XXXXXXXX_XXXXXXX_XXXXX000_

00000000_00000000_0000...

↑ lspc

Example 11

Note that the position of the least significant possible non-zero carry-out (lspc) bit, indicated with an "↑" in Examples 9, 10 and 11, shifts to the left one bit after processing by full adders module 206 and another bit after processing by half adders module 208.

As shown in FIG. 2, in the present embodiment, the row of half adders, i.e., half adders module 208, eliminates a carry out value of 2, resulting in a carry out value of at most 1, from each of the carry look-ahead adder sections 218 and 220 due to the addition of the extra bits K and R, or W, Z, N, and M, as further described herein.

In one embodiment, the sum output, X, and the carry output, Y are obtained and output from half adders module 208, for example, respectively at outputs 208_3 and 208_4, and input in sections to respective carry-look-ahead adders 218, 220, and 222. In one embodiment, the terms X and Y output from half adders module 208 are divided into three sections as shown in FIG. 2 in order to provide both double and single precision results.

In Example 12, the terms X and Y are divided into two sections where the numbers over the terms X and Y, i.e., 2 and 1, indicate the respective section, i.e., section 2 and section 1. In one embodiment, section 1 corresponds to the least significant bit sections of terms X and Y, and section 2 corresponds to the most significant bit sections of terms X and Y. If more than one precision is possible, in one embodiment, more than two sections can be used, as for example in FIG. 2 in which three sections are used because both single and double precision are provided for.

.   .   .       2222222222222222222222      2222
11111111111111111111111111111 . . .
X= . . .   XXXX.XXXXXXXX_XXXXXXX_XXXX
XXXX_XXXXXXXX_XXXXXXXX_XXXX . . .
Y= . . . XXXX.XXXXXXXX_XXXXXXX_XXXX 0000_
00000000_00000000_0000 . . .

Example 12

Thus, in one embodiment, the respective portions of terms X and Y identified for section 1 are input to carry look-ahead adder 218; the respective portions of the sum output and the carry output identified for section 2 are input to carry look-ahead adder 220; and the sum output and the carry output identified for section 3 are input to carry look-ahead adder 222. The carry-look-ahead adders 218, 220, and 222, each sum a respective section independently, for both a carry-in value of 0 and a carry-in value of 1.

Thus, for example, section 1 bits of term Y output from half adders module 208 at output 208_4 are input to CLA 218 at input 218_1. Section 2 bits of term Y output from half adders module 208 at output 208_4 are input to CLA 220 at input 220_1. Section 3 bits of term Y output from half adders module 208 at output 208_4 are input to CLA 222 at input 222_1.

Further, section 1 bits of term X output from half adders module 208 at output 208_3 are input to CLA 218 at input 218_2. Section 2 bits of term X output from half adders module 208 at output 208_3 are input to CLA adder 220 at input 220_2. Section 3 bits of term X output from half adders module 208 at output 208_4 are input to CLA 222 at input 222_2.

First, the msb of the output of section 1, e.g., the msb output of mux 226, corresponding to a carry-in of 0 to mux select 226_3 is the carry-in to be used for section 2, e.g., CLA 220, by being the mux select input 228_3 to mux 228. The msb of the output of section 2, e.g., the msb output of mux 228 is the carry-in to be used for section 3, e.g., CLA 222, by being the mux select input 230_3 to mux 230. The msb of the output of section 3, e.g., the msb output of mux 230 is the carry-in to be used for the last section, e.g., incrementer 224, by being the mux select input 232_3 to mux 232. Note that the last section utilizes an incrementer, e.g., increment module 224 is not a full addition. Increment module 224 increments; if an unincremented value is needed, e.g., if the msb output of mux 230 is zero, then the unincremented value from alignment module 202 is selected by mux 232.

In one embodiment, the msb output of the last section, e.g., the msb output of mux 232, is herein termed value E, the end around carry. If the computation is addition, E=0. However, if the computation is subtraction, E=1 indicates that |A*B|>|C|, and (A*B)+~C+1 is computed. Alternatively, if the computation is subtraction, E=0 indicates that |A*B|<|C|, and thus ~((A*B)+C) is computed.

Thus, each section is viewed again. This time, the carry-in chosen for section 1 is the value of E. This provides the proposed output for the bits in section 1 except that the three high order bits of the section may yet need K and R, or N, M, W, and Z, to be added in if a double precision result is required. If a single precision result is required, no bits are added in for section 1, but the three high order bits of section 2 may yet need K and R, or N, M, W, and Z to be added in.

Thus, while the operations of full adders 206, half adders module 208, and most of the operations of CLAs 218, 220 and 222 are being performed, the possible sums for the high order 3 replacement bits are obtained for the precision needed. The 3 high order replacement bits are the three msb bits of the section with K and R, or N, M, W, and Z added in. In one embodiment, the replacement values are calculated by rounding and speculation module 216. The replacement carry out bit is the carry out of the section after K and R, or N, M, W, and Z added in. Once the carry-in to the three high order positions, which is the carry out of the previous section, are known for the appropriate value of E, then those three high order bits, are replaced with the correct values, i.e., the replacement values, and their replacement carry-out is then used for the carry-in of the next section, i.e., the next section is section 2 for double precision and is section 3 for single precision.

In order to compute the replacement values for the msb of a carry look-ahead adder section, that is, modules 218 and 220, in one embodiment, computations are performed in rounding and speculation module 216 as shown in Examples 13-26. These examples are for a double precision result where positions 62 is the lsb double precision replacement position, 63 is the middle double precision replacement position, 64 is the msb double precision replacement position, and 65 is the double precision replacement carry-out position. Position 61 is the position to the right of position 62. Thus, result [64:62] are the double precision replacement values and result [65] is the double precision replacement carry-out value. These positions place the lsb of the double precision value for A*B in column 10, embedded within a 64×64 integer multiply array. The corresponding single precision positions would be result [93:91] for the single precision replacement values and result [94] would be the single precision replacement carry-out value.

In Examples 13-26, sum [63:61] is the value of carry save adder 218 output 218_4 in columns 61, 62, and 63; carry [63:61] is the value of carry save adder 218 output 218_3 in columns 61, 62, and 63; and G represents the carry-in value to position 61 using inputs before full adders 206 and half adders 208.

For msb=0 and G=0 and R=0 and no carry-in
 a=sum[61] AND carry[61]
 c, b=sum[62]+carry[62]+C[62]
 e, d=sum[63]+carry[63]+C[63]
 f=sum[62] XOR carry[62] XOR C[62]
 result [62]=a XOR b
 result [63]=(a AND b) XOR c XOR d
 g=(c AND d) OR (a AND b AND (c OR d))
 h=e XOR f
 result[65:64]=g+h Example 13

For msb=0 and G=1 and R=0 and no carry-in
 a=sum[61] OR carry [61]
 c, b=sum[62]+carry[62]+C[62]
 e, d=sum[63]+carry[63]+C[63]
 f=sum[62] XOR carry[62] XOR C[62]
 result[62]=a XOR b
 result[63]=(a AND b) XOR c XOR d
 g=(c AND d) OR (a AND b AND (c OR d))
 h=e XOR f
 result [65:64]=g+h Example 14

For msb=0 and G=0 and R=1 and no carry-in and for msb=0 and G=0 and R=0 and carry-in
 a=sum[61] AND carry[61]
 c, b=sum[62]+carry[62]+C[62]
 e, d=sum[63]+carry[63]+C[63]
 f=sum[62] XOR carry[62] XOR C[62]
 result [62]=a XNOR b
 result [63]=(a OR b) XOR c XOR d
 g=(c AND d) OR (a OR b AND (c OR d))
 h=e XOR f
 result [65:64]=g+h Example 15

For msb=0 and G=1 and R=1 and no carry-in and for msb=0 and G=1 and R=0 and carry-in
 a=sum[61] OR carry [61]
 c, b=sum[62]+carry[62]+C[62]
 e, d=sum[63]+carry[63]+C[63]
 f=sum[62] XOR carry[62] XOR C[62]
 result[62]=a XNOR b
 result[63]=(a OR b) XOR c XOR d
 g=(c AND d) OR (a OR b AND (c OR d))
 h=e XOR f
 result[65:64]=g+h Example 16

For msb=1 and G=0 and R=0 and no carry-in
 a=(sum[62] OR carry[62]) AND sum[61] AND carry [61]
 b=(sum[62] AND carry[62])
 c=a OR b
 e, d=sum[63]+carry[63]+C[63]
 f=sum[62] XOR carry[62] XOR C[62]
 result[62]=C[62]
 g, result[63]=c+d
 h=e XOR f
 result[65:64]=g+h Example 17

For msb=1 and G=1 and R=0 and no carry-in
 a=(sum[62] OR carry[62]) AND (sum[61] OR carry[61])
 b=(sum[62] AND carry[62])
 c=a OR b
 e, d=sum[63]+carry[63]+C[63]
 f=sum[62] XOR carry[62] XOR C[62]
 result[62]=C[62]
 g, result[63]=c+d
 h=e XOR f
 result[65:64]=g+h Example 18

For msb=1 and G=0 and R=1 and no carry-in
 a=(sum[62] OR carry[62]) AND sum[61] AND carry [61]
 b=(sum[62] AND carry[62])
 c=a OR b
 e, d=sum[63]+carry[63]+C[63]
 f=sum[62] XOR carry[62] XOR C[62]
 result[62]=C[62]
 g, result[63]=c+d+1
 h=e XOR f
 result[64]=g XOR h
 result[65]=g AND h Example 19

For msb=1 and G=1 and R=1 and no carry-in
 a=(sum[62] OR carry[62]) AND (sum[61] OR carry[61])
 b=(sum[62] AND carry[62])
 c=a OR b
 e, d=sum[63]+carry[63]+C[63]
 f=sum[62] XOR carry[62] XOR C[62]
 result[62]=C[62]
 g, result[63]=c+d+1
 h=e XOR f
 result[64]=g XOR h
 result[65]=g AND h Example 20

For msb=0 and G=0 and R=1 and carry in
 c, b=sum[62]+carry[62]+(sum[61] AND carry[61])
 e, d=sum[63]+carry[63]+C[63]
 f=sum[62] XOR carry[62] XOR C[62]
 m, result[62]=b+C[62]
 g, n=c+d+1
 h=e XOR f
 result[63]=m XOR n
 result[64]=g XOR h XOR (m AND n)
 result[65]=(g AND h) OR ((g OR h) AND m AND n)

Example 21

For msb=0 and G=1 and R=1 and carry-in
 c, b=sum[62]+carry[62]+(sum[61] OR carry[61])

e, d=sum[63]+carry[63]+C[63]
f=sum[62] XOR carry[62] XOR C[62]
m, result[62]=b+C[62]
g, n=c+d+1
h=e XOR f
result[63]=m XOR n
result[64]=g XOR h XOR (m AND n)
result[65]=(g AND h) OR ((g OR h) AND m AND n)

Example 22

For msb=1 and G=0 and R=0 and carry in
a=(sum[62] OR carry[62]) AND sum[61] AND carry [61]
b=(sum[62] AND carry[62])
c=a OR b
e, d=sum[63]+carry[63]+C[63]
f=sum [62] XOR carry[62] XOR C[62]
result[62]=NOT C[62]
g, result[63]=c+d+C[62]
h=e XOR f
result[65:64]=g+h Example 23

For msb=1 and G=1 and R=0 and carry-in
a=(sum[62] OR carry[62]) AND (sum[61] OR carry[61])
b=(sum[62] AND carry[62])
c=a OR b
e, d=sum[63]+carry[63]+C[63]
f=sum[62] XOR carry[62] XOR C[62]
result[62]=NOT C[62]
result[63]=c+d+C[62]
h=e XOR f
result[65:64]=g+h Example 24

For msb=1 and G=0 and R=1 and carry-in
a=(sum[62] OR carry[62]) AND sum[61] AND carry [61]
b=(sum[62] AND carry[62])
c=a OR b
e, d=sum[63]+carry[63]+C[63]
f=sum[62] XOR carry[62] XOR C[62]
result[62]=NOT C[62]
g, p=c+d+C[62]
result[63]=NOT p
h=e XOR f
result[65:64]=g+h+p Example 25

For msb=1 and G=1 and R=1 and carry-in
a=(sum[62] OR carry[62]) AND (sum[61] OR carry[61])
b=(sum[62] AND carry[62])
c=a OR b
e, d=sum[63]+carry[63]+C[63]
f=sum[62] XOR carry[62] XOR C[62]
result[62]=NOT C[62]
g, p=c+d+C[62]
result[63]=NOT p
h=e XOR f
result[65:64]=g+h+p Example 26

The replacement bit values generated in rounding and speculation module 216 are output, for example at outputs 216_8 and 216_9 (for single precision), or 216_10 and 216_11 (for double precision).

A sum for a carry in of 0 and a sum for a carry in of 1 are generated and output from CLA 222 at outputs 222_3 and 222_4; these sums are input to mux 230 at inputs 230_1 and 230_2. A sum for a carry in of 0 and a sum for a carry in of 1 are generated and output from CLA 220 at outputs 220_3 and 220_4; these sums and together with the replacement bits from rounding and speculation module 216 (for unfused rounding single precision only) are input to mux 228 at inputs 228_1 and 228_2. A sum for a carry in of 0 and a sum for a carry in of 1 generated and output from CLA 218 at outputs 218_3 and 281_4; these sums together with the replacement bits from rounding and speculation module 216 (for unfused rounding double precision only) are input to mux 226 at inputs 226_1 and 226_2. The carry-out from mux module 230 is used to select the incremented or unincremented value in mux 232.

The selected sums of each muxs 226, 228, 230 and 232 are input to normalizer 240. For example, in one embodiment, the selected sum generated and output from mux 226 at output 226_4 is input to normalizer 240 at input 240_4. The selected sum generated and output from mux 228 at output 228_4 is input to normalizer 240 at input 240_3. The selected sum generated and output from mux 230 at output 230_4 is input to normalizer 240 at input 240_4. The selected value output from mux 232 at output 232_4 is input to normalizer 240 at input 240_1.

Normalizer 240 normalizes the input values, and generates a normalized sum which is the normalized sum of operand C and the rounded value of the product of operand A and operand B. The normalized sum is generated and output from normalizer 240 at output 240_5 and input to rounding module 250 at input 250_1.

Rounding module 250 rounds the normalized sum to generate the output unfused multiply-add result. The unfused multiply-add result is output from rounding module 250 at output 250_2 and can be further output from fused-unfused FMA module 200 at an output 200_4.

Fused Multiply-Add Rounding Mode

Alternatively, in fused multiply-add rounding mode, in one embodiment, operand C is input to alignment module 202, and operand A and operand B are input to carry save adder (CSA) 204. In CSA 204, the partial products of operand A and operand B are formed and summed to produce two terms, term S and term T. Early p&g module 210, sticky bit module 212, product bit module 214, and rounding and speculation module 216 are not used for fused multiply-add rounding. Term S and term T, if added together, would form the product of A*B. While the computations of CSA 204 are being carried out, operand C is aligned in alignment module 202 to align the binary point of C with the position of the binary point for the product A*B. Binary points and the alignment of floating point numbers are terms well known to those of skill in the art and not further described in detail herein to avoid detracting from the principles of the invention.

If subtraction is needed, instead of addition, for example, operands A and B are positive and operand C is negative, or as another example, operands A, B, and C are all positive and (A*B)–C is requested, then the aligned C is complemented. Herein the term aligned C is used whether or not C has been complemented.

Terms S and T are not truncated. Terms S, T and the aligned C term are then input to full adders 206 where the aligned C term is summed with the terms S and T to produce two terms, X and Y. The terms X and Y are then input to half adders module 208 resulting in terms X' and Y', which are the sum output and the carry output of module 208, respectively. The terms X' and Y' are then input to carry look-ahead adder modules 218, 220, and 222 that calculate the sum of (A*B)+C for a carry-in of 1 and for a carry-in of 0. The carry-out of CLA modules 218, 220, and 222 is used to select the incremented or unincremented value in mux 232. This result is the end around carry for a sum that is negative. No replacement values are used. The result sum is normalized in normalizer 240 and then rounded in rounding module 250.

In subtraction, if the absolute value of (A*B) is greater than the absolute value of C, then (A*B)+~C+1 is computed. Alternatively, if the absolute value of (A*B) is less than the absolute value of C, then ~((A*B)+~C) is computed.

Figure 3:
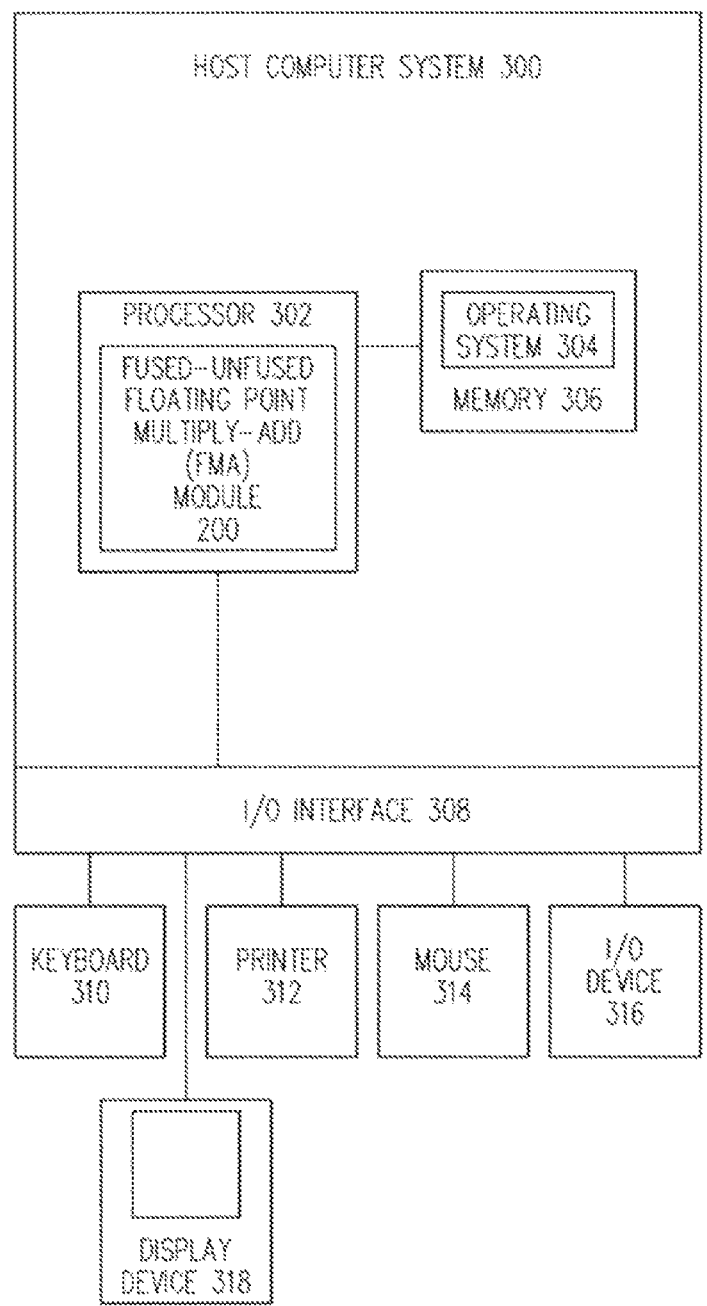
FIG. 3 illustrates a computer system having a computer processor including the single fused-unfused floating point multiply-add (FMA) module of FIG. 2 in accordance with one embodiment of the invention.

FIG. 3 illustrates a computer system 300 having a computer processor including the single fused-unfused floating point multiply-add (FMA) module 200 of FIG. 2 in accordance with one embodiment of the invention. In FIG. 3, host computer system 300, sometimes called a client or user device, typically includes a central processing unit (CPU) 302, hereinafter processor 302, an input/output (I/O) interface 308, a memory 306, and an operating system 304.

Host computer system 300 may further include standard devices like a keyboard 310, a mouse 314, a printer 212, and a display device 316, as well as, one or more standard input/output (I/O) devices 316, such as a compact disk (CD) or DVD drive, floppy disk drive, or other digital or waveform port for inputting data to and outputting data from host computer system 300. In one embodiment, computer processor 302 performs one or more operations on input floating point operands initiated by one or more opcodes generated during the processing of computer code being executed on computer system 300.

In one embodiment, a single opcode, herein termed an unfused multiply-add rounding opcode, input to computer processor 302 is used to initiate an unfused multiply-add rounding operation by single fused-unfused FMA module 200 with the generation of an unfused multiply-add rounding result as earlier described herein with reference to FIG. 2. In one embodiment, a different single opcode, herein termed a fused multiply-add rounding opcode, input to computer processor 302 is used to initiate a fused multiply-add rounding multiply-add operation by single fused-unfused FMA module 200 with the generation of a fused multiply-add rounding result as earlier described herein with reference to FIG. 2.

In another embodiment, a single opcode with a deterministic mode bit is input to computer processor 302 to indicate generation of a fused multiply-add rounding result or an unfused multiply-add rounding result. If the mode bit is set a first way, e.g., set to one, a fused multiply-add rounding result is generated, and if the mode bit is set a second way, e.g., set to zero, an unfused multiply-add rounding result is generated.

This disclosure provides exemplary embodiments. The scope of the various embodiments described herein is not limited by these exemplary embodiments. Numerous variations, whether explicitly provided for by the specification or implied by the specification or not, may be implemented by one of skill in the art in view of this disclosure.

What is claimed is:

1. A computer system comprising:
   a memory; and
   a processor coupled to said memory, said processor comprising:
   a fused-unfused floating point multiply-add (FMA) module, said fused-unfused FMA module for receiving a first multiply term, a second multiply term, and an addition term,
   wherein in response to said processor receiving a single unfused multiply-add opcode, said fused-unfused FMA module generates an unfused multiply-add rounding result,
   wherein in response to said processor receiving a single fused multiply-add opcode, said fused-unfused FMA module generates a fused multiply-add rounding result,
   wherein said unfused multiply-add rounding result is a rounded sum of said addition term with a rounded value of the product of said first multiply term and said second multiply term without obtaining the product of said first multiply term and said second multiply term,
   wherein in generating said unfused multiply-add rounding result, instead of generating said product of said first multiply term and said second multiply term, a first terminal partial product and a second terminal partial product are generated from said first multiply term and said second multiply term, and
   further wherein each said first terminal partial product and said second terminal partial product are truncated to produce, respectively, a truncated first terminal partial product and a truncated second terminal partial product, before being combined with said addition term.

2. The computer system of claim 1 wherein said fused multiply-add rounding result is a rounded sum of said addition term with a value of the product of said first multiply term and said second multiply term without obtaining the product of said first multiply term and said second multiply term.

3. The computer system of claim 1 wherein said addition term is aligned to generate an aligned addition term before being combined with said truncated first terminal partial product and said truncated second terminal partial product.

4. The computer system of claim 3 wherein said aligned addition term is combined with said truncated first terminal partial product and said truncated second terminal partial product to generate a carry look-ahead value.

5. The computer system of claim 4 wherein one or more replacement bit values are generated, wherein said one or more replacement bit values are obtained from one or more bit values of said first multiply term and said second multiply term and said aligned addition term.

6. The computer system of claim 5 wherein said aligned addition term is added with said truncated first terminal partial product and said truncated second terminal partial product, and rounded to produce said unfused multiply-add rounding result when selected bits of said sum are replaced with said replacement value.

7. A computer processor comprising:
   a fused-unfused floating point multiply-add (FMA) module, said fused-unfused FMA module for receiving a first multiply term, a second multiply term, and an addition term,
   wherein in response to said processor receiving a single unfused multiply-add opcode, said fused-unfused FMA module generates an unfused multiply-add rounding result,
   wherein in response to said processor receiving a single fused multiply-add opcode, said fused-unfused FMA module generates a fused multiply-add rounding result,
   wherein said unfused multiply-add rounding result is a rounded sum of said addition term with a rounded value of the product of said first multiply term and said second multiply term without obtaining the product of said first multiply term and said second multiply term,
   wherein in generating said unfused multiply-add rounding result, instead of generating said product of said first multiply term and said second multiply term, a first terminal partial product and a second terminal partial product are generated from said first multiply term and said second multiply term, and further wherein each said first terminal partial product and said second terminal partial product are truncated to produce respectively a truncated first terminal partial product and a truncated second terminal partial product before being combined with said addition term.

8. The computer processor of claim 7 wherein said fused multiply-add rounding result is a rounded sum of said addition term with a value of the product of said first multiply term and said second multiply term without obtaining the product of said first multiply term and said second multiply term.

9. The computer processor of claim 7 wherein said addition term is aligned to generate an aligned addition term before being combined with said truncated first terminal partial product and said truncated second terminal partial product.

10. The computer processor of claim 9 wherein said aligned addition term is combined with said truncated first terminal partial product and said truncated second terminal partial product to generate a carry look-ahead value.

11. The computer processor of claim 10 wherein one or more replacement bit values are generated, wherein said one or more replacement bit values are obtained from one or more bit values of said first multiply term and said second multiply term and said aligned addition term.

12. The computer processor of claim 11 wherein said aligned addition term is added with said truncated first terminal partial product and said truncated second terminal partial product, and rounded to produce said unfused multiply-add rounding result when selected bits of said sum are replaced with said replacement value.

13. A computer system comprising:
a memory; and
a processor coupled to said memory, said processor comprising:

a fused-unfused floating point multiply-add (FMA) module, said fused-unfused FMA module, said fused-unfused FMA module comprising:

means for receiving a first multiply term, a second multiply term, and an addition term; and means for generating an unfused multiply-add rounding result of said first multiply term, said second multiply term, and said addition term, when in an unfused multiply-add rounding mode, and for generating a fused multiply-add result of said first multiply term, said second multiply term and said addition term, when in a fused multiply-add rounding mode, wherein said unfused multiply-add rounding result is a rounded sum of said addition term with a rounded value of the product of said first multiply term and said second multiply term without obtaining the product of said first multiply term and said second multiply term, wherein in generating said unfused multiply-add rounding result, instead of generating said product of said first multiply term and said second multiply term, a first terminal partial product and a second terminal partial product are generated from said first multiply term and said second multiply term, and further wherein each said first terminal partial product and said second terminal partial product are truncated to produce, respectively, a truncated first terminal partial product and a truncated second terminal partial product, before being combined with said addition term.

14. The computer system of claim 13 wherein said fused multiply-add rounding result is a rounded sum of said addition term with a value of the product of said first multiply term and said second multiply term without obtaining the product of said first multiply term and said second multiply term.

* * * * *